United States Patent Office 3,158,622
Patented Nov. 24, 1964

3,158,622
N - BENZYL - N - (1,4 - BENZODIOXAN - 2 - METHYL)-HYDRAZINE AND CORRESPONDING HYDRAZONES
Daniele Bovet, Rodolfo Landi Vittory, and Giovanni Battista Marini-Bettolo, all of Rome, Italy, assignors to Istituto de Angeli, Milan, Italy, a body corporate of Italy
No Drawing. Filed Dec. 21, 1961, Ser. No. 161,400
Claims priority, application Great Britain, Dec. 13, 1960, 43,911/60
6 Claims. (Cl. 260—340.3)

This invention relates to physiologically active substituted hydrazines and their hydrazones formed with aldehydes and ketones.

According to the present invention we provide compounds of the general formula

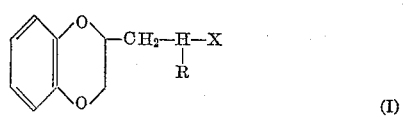
(I)

(in which R represents a hydrogen atom or an alkyl or aralkyl group and X represents an amino group or an imino group of the formula

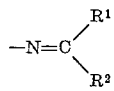

where $R^1$ and $R^2$, which may be the same or different, represent hydrogen atoms or alkyl, aryl or aralkyl groups) and their acid addition salts containing substantially non-toxic anions. The hydrazones according to the invention appear to hydrolyse after administration to yield the free hydrazines and are hence of substantially equivalent activity. Compounds of special interest for their therapeutic importance include 2-methyl benzodioxan-1:4-hydrazine, its isopropylidine derivative and, more especially, N-benzyl-N-(2-methyl-1,4-benzodioxan)-hydrazine.

The compounds according to the invention have a stimulant action on the central nervous system, which is produced by inhibition of monoaminooxidase. They also have a favourable ratio of toxicity to activity, and their action is more sustained than that of certain known stimulants, for example iproniazid. Further, the new compounds are more effective in inhibiting cerebral monoaminooxidase than in inhibiting hepatic monoaminooxidase and hence their stimulant activity is accompanied by less liver-damage than is caused by such compounds as iproniazid in which the ratio of hepatic monoaminoxidase inhibition to cerebal monoaminooxidase inhibition is higher. The compounds further exert a favourable action on the cardiocirculatory system in that they reduce any tendency to thrombosis and have a hypotensive action.

The compounds according to the invention may be prepared by an convenient process for example, by the following process which constitutes a feature of the invention.

A compound of the general formula

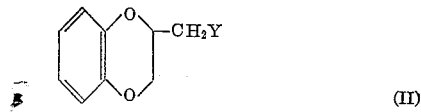
(II)

(where Y represents an atom or grouping capable of splitting off with an amino hydrogen atom during condensation) is condensed with a compound of the general formula

(III)

(where R and X have the meanings given above).

The substitutent Y may thus, for example, be a halogen atom, a sulphuric acid ester group or an aliphatic or aromatic sulphonic acid ester group.

The reaction mixture is preferably warmed initially, and then maintained at a temperature between 80 and 120° C. The reaction is preferably carried out in an inert atmosphere e.g. nitrogen, advantageously in the presence of a solvent medium. Suitable solvents which may be used as reaction media include for example alcohols, ethers and aliphatic, cycloaliphatic and aromatic hydrocarbon and halogenated hydrocarbon solvents. The reaction is preferably carried out in the presence of an acid binding agent, or, alternatively an excess of the said hydrazine compound is used to bind the liberated acid. Where unsubstituted hydrazine is a reactant it is advantageous to use a considerable excess of hydrazine to reduce formation of disubstituted hydrazines.

The 2-(hydrazino-methyl)-1:4-benzodioxans of Formula I thus produced may then, if desired, be condensed with a carbonyl compound of the general formula $R^1$—CO—$R^2$ (wherein $R^1$ and $R^2$ have the meanings given above). This reaction is preferably carried out at an elevated temperature in an inert atmosphere e.g. under nitrogen, advantageously in the presence of a solvent. Suitable solvents include aliphatic, cycloaliphatic and aromatic hydrocarbons and alcohols. Alternatively, an excess of the carbonyl compound may be used as solvent. The condensation is often facilitated by the presence of a small quantity of a mineral acid, e.g. sulphuric, hydrochloric, phosphoric acid etc.

The hydrazones of Formula I where R=H and X=

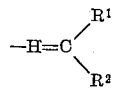

prepared, for example, by one of the above methods may then be reacted with a compound of the general formula RY (wherein R and Y have the meanings given above). This reaction is preferably carried out at an elevated temperature, in the presence of an acid binding agent, advantageously in a solvent medium. Suitable acid binding agents include, for example, the oxides, hydroxides, carbonates and bicarbonates of the alkali and alkaline earth metals, tertiary amines e.g. trimethylamine and heterocyclic bases e.g. pyridine or quinoline. Suitable solvents includes hydrocarbons e.g. toluene or benzene, ketones e.g. acetone or methyl ethyl ketone, halogenated aliphatic hydrocarbons e.g. tetrachlorethane or carbon tetrachloride and ethers e.g. tetrahydrofuran and dioxan. Alternatively, an excess of tertiary amine or heterocyclic base may be used as solvent medium.

The substituted hydrazones of the formula

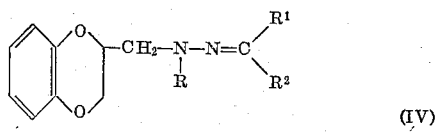
(IV)

(where $R^1$ and $R^2$ have the meanings given above) may then, if desired, be hydrolysed, preferably in aqueous suspension at an elevated temperature, advantageously in the presence of an acid e.g. a mineral acid such as hydrochloric or sulphuric acid.

Alternatively, a 2-hydrazino-methyl benzodioxan-1:4 prepared, for example, by the method described above, may then be reacted with a compound of the general formula RY (as defined above) to yield a compound of the general Formula I in which X represents an amino group, which may then, if desired, be reacted with a carbonyl compound of the general formula R¹—CO—R² (wherein R¹ and R² have the meanings given above) to yield a compound of the general Formula I in which X represents an imino group

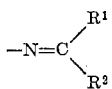

The physiologically acceptable salts of the compounds according to the invention may be prepared by any convenient method, for example by reacting the free base with an acid, for example, sulphuric, hydrochloric, phosphoric, methane sulphonic, ethane sulphonic, oxalic, tartaric, maleic, fumaric or succinic acid.

The compounds according to the invention may be formulated for administration in pharmaceutical compositions in association with a pharmaceutical carrier or excipient.

These compositions which constitute a further feature of the invention may be adapted for oral, rectal or parenteral administration.

The compositions are advantageously formulated in the form of dosage units, each dosage unit being adapted to supply a single dose of the active ingredient. The daily dose of the active ingredient is conveniently 20 to 60 mg., and dosage units of compositions according to the invention advantageously contain amounts of the active component within the range 1.0 to 20 mg. Suitable dosage unit forms are capsules, pills, dragees, tablets and suppositories.

Compositions for oral administration may take the form of solid formulations, employing solid carriers or excipients. Examples of such formulations are tablets, pills, capsules or dragees. The compositions for oral administration may also be in liquid form, for example in the form of suspensions, emulsions, linctuses or syrups, the carrier including water or an oily liquid together with sweetening, thickening, dispersing, flavouring and/or preservative agents.

Compositions for parenteral administration preferably include as carrier a sterile, pyrogen-free parenterally acceptable oil e.g. arachis oil, if desired containing dispersing and other agents.

In compositions for rectal administration, the carrier is preferably a conventional suppository base, such as, for example a glyceride or cocoa butter.

In order that the invention may be well understood, the following examples are given by way of illustration only.

EXAMPLE 1

2-bromomethylbenzodioxan-1:4 (0.25 mol) was added to hydrazine hydrate (85%, 0.25 mol) in one hour and a half (temperature 80–85° C.) in a nitrogen atmosphere. The mixture was then heated for 2 hours at 100–110° C. At the end of the heating, the 2-methyl-benzodioxan-1:4-hydrazine was extracted with ether; the aqueous layer containing the excess of hydrazine hydrate might be recycled in successive operations and when it has been enriched with hydrazine salts it might be recovered. The ether layer was dried over $K_2CO_3$, evaporated to dryness and the residue was distilled, the fraction which passed at 115–118° C. at 0.03 mm. Hg being collected. (Yield 70%.)

The 2-methyl-benzodioxan-1:4-hydrazine is a colourless, viscous, water-soluble liquid unstable in the presence of air.

The neutral oxalate, $(C_9H_{12}O_2N_2)_2 \cdot (COOH)_2$ was prepared by adding stoichiometric quantities of 2-methyl-benzodioxan-1:4-hydrazine to an alcoholic solution of oxalic acid. It crystallizes from 95% ethyl alcohol in needles melting at 177–178° C. with decomposition.

The isopropylidene derivative was prepared by refluxing the 2-methyl-benzodioxan-1:4-hydrazine with an excess of acetone for 2 hours. The solvent was distilled off and the residue distilled in a nitrogen atmosphere, the fraction which passed at 96–100° C. at 0.02–0.01 mm. Hg being collected.

The isopropylidene derivative of 2-methyl-benzodioxan-1:4-hydrazine is a colourless, viscous oil, insoluble in water.

EXAMPLE 2

(a) 2-bromomethyl-benzodioxan-1:4 (0.13 mol) was added to benzylhydrazine (0.51 mol) at 80–85° C. in about one and half hours with stirring in an atmosphere of nitrogen.

The mixture was then heated for 2 hours at 100–110° C. At the end of the heating, a colourless, very viscous oil was obtained, which was treated again with water and ether. The ether layer was washed with water and dried, and the ether distilled off in a stream of nitrogen. The residue was distilled under reduced pressure in a nitrogen atmosphere. The fraction which passed at 149–153° C./0.03 mm. Hg was collected. Yield 86%.

This procedure was repeated using only 0.24 mol of benzyl hydrazine to yield 54% of the desired product.

The N-benzyl-N-(2-methyl-benzodioxan-1:4)-hydrazine is a colourless, very viscous oil, soluble in organic solvents, insoluble in water.

The hydrochloride ($C_{16}H_{18}N_2O_2 \cdot HCl$) was obtained by introducing gaseous HCl into the ether solution. It was then crystallized from alcohol-ether; M.P. 133° C. (decomp.).

The acid oxalate $C_{16}H_{18}N_2O_2 \cdot (COOH)_2$ and neutral oxalate $(C_{16}H_{18}N_2O_2)_2 \cdot (COOH)_2$ were prepared by mixing alcoholic solutions of oxalic acid and N-benzyl-N-(2-methyl-1,4-benzodioxan)-hydrazine in equimolecular amounts, a mixture is precipitated of acid oxalate and neutral oxalate, which may be separated by crystallization from 95% ethanol. The acid oxalate, which is less soluble than the other, crystallizes in plates melting at 195°–196° C. with decomposition.

After further cooling and standing, the neutral oxalate is separated from the mother liquor in a microcrystalline form, which melts at 159°–161° C. with decomposition. Varying the ratios of the reactants, it is possible to vary the amounts of acid salt and neutral salt obtained.

The p-nitrobenzylidene derivative ($C_{23}H_{21}O_4N_3$) was prepared by heating an alcoholic solution of p-nitrobenzaldehyde and N-benzyl-N-(2-methyl-benzodioxan-1:4)-hydrazine in the presence of small quantities of concentrated mineral acids. It crystallizes from 95% ethyl alcohol in orange-yellow plates melting at 111–112° C.

The acid tartrate ($C_{16}H_{18}N_2O_2 \cdot C_4H_6O_6$) is prepared from equimolecular amounts of N-benzyl-N-(2-methyl benzodioxan-1:4)-hydrazine and tartaric acid (aqueous solution) or by adding an aqueous solution of tartaric acid to the alcoholic solution of the hydrazine. After adding water, the salt was obtained. The compound crystallises from methanol or ethanol in crystalline needles, melting at 127–132° C. (decomp.).

This compound is soluble in acetone, dioxan, carbon tetrachloride and insoluble in ether, benzene and chloroform. It is almost insoluble in water.

(b) *Preparation of N-Benzyl-N-(2-Methyl-1,4-Benzodioxan)-Hydrazine*

0.1 mol of 2-bromomethyl-1,4-benzodioxan are added to a mixture of 0.1 mol of benzylhydrazine and 0.1 mol of triethylamine, at 80–85° C., during about an hour, with strong stirring and in a nitrogen atmosphere. The mixture is then heated at 100–110° C. for 2 hours.

After the heating, ether and water are added. After washing the ethereal layer with water and subsequent drying, the ether is removed by distillation in a nitrogen atmosphere, and the residue is distilled at reduced pressure and in a nitrogen atmosphere. The fraction passing in the 140–150° C. range at 0.03–0.06 mm. Hg is collected. Yield 58%.

(c) *Preparation of N-Benzyl-N-(2-Methyl-1,4-Benzodioxan)-Hydrazine*

0.03 mol of benzyl chloride are added to 0.15 mol of 2-methyl-1,4-benzodioxan-hydrazine at 80–85° C. in 30 minutes, with strong stirring and in a nitrogen atmosphere. The mixture is then heated to 100–110° C. for 3 hours. After the heating, ether and water are added. After washing the ethereal layer with water and subsequent drying the ether is removed by distillation in a nitrogen atmosphere, and the residue is distilled at reduced pressure in a nitrogen atmosphere. The fraction passing in the 140–150° C. range at 0.03–0.06 mm. Hg is collected. Yield 64%.

(d) *Preparation of N-Benzyl-N-(2-Methyl-1,4-Benzodioxan)-Hydrazine*

0.1 mol of 2-bromomethyl-1,4-benzodioxan are added to a mixture of 0.1 mol of benzyl-hydrazine and 0.1 mol of powdered NaOH at 80–85° C., in about an hour, under strong stirring and in a nitrogen atmosphere. The mixture is then heated to 100–110° C. for 2 hours.

After heating, ether and water are added. After washing the ethereal layer with water and subsequent drying the ether is removed by distillation in a nitrogen atmosphere, and the residue is distilled at reduced pressure in a nitrogen atmosphere. The fraction passing in the 140–150° C. range at 0.03–0.06 mm. Hg consisting of N-benzyl-N-(2-methyl-1,4-benzodioxan)-hydrazine, is collected. Yield 50%.

EXAMPLE 3

(a) To a solution (obtained by dissolving) of N-(2-methylbenzodioxan-1:4) - N' - isopropylidene hydrazine (0.1 mol) in acetone (50 ml.) (dried over $K_2CO_3$) methyl iodide (0.12 mol) and dry potassium carbonate (0.06 mol) were added at room temperature. The mixture was then boiled 4–5 hours. The solvent was then distilled off and the residue, consisting of N-methyl-N-(2-methyl-benzodioxan-1:4) - isopropylidene hydrazine was distilled, the fraction passing at 105–112°/0.2 mm. Hg being collected. The product was hydrolyzed with dil. HCl (1:10) by boiling for 3 hours. The solution of hydrazine salt was cooled, made alkaline with 40% NaOH and the free base extracted with ether. The ether layer was dried and evaporated; the oily residue was distilled in vacuo. This fraction, consisting of N-methyl-N-(2-methyl-1,4-benzodioxan)-hydrazine, was distilled at 105–110° C./0.2 mm. Hg.

The neutral oxalate $(C_{10}H_{14}O_2N_2)_2.(COOH)_2$ was precipitated by adding the alcoholic solution of oxalic acid to an alcoholic solution containing an excess of N-methyl-N-(2-methyl-1,4 - benzodioxane) - hydrazine. It crystallizes from diluted alcohol. The neutral oxalate melts at 187° C.

(b) To a solution obtained by dissolving 0.1 mol of N-(2-methyl-1,4-benzodioxan)-N'-isopropylidene - hydrazine in 50 ml. acetone, dried over $K_2CO_3$, 0.12 mol of ethyl iodide and 0.06 mol of dry potassium carbonate were added, at room temperature.

The mixture was then boiled 4–5 hours. The solvent was then distilled off and the residue was distilled in vacuo, collecting the distillation fraction at interval 105–107° C./0.5 mm. consisting of N-ethyl-N-(2-methyl-1,4-benzodioxan) isopropylidene-hydrazine.

The product obtained was hydrolyzed with dil. HCl (1:10) by boiling for 3 hours. The solution of hydrazine salt was cooled, made alkaline with 40% NaOH and the free base was extracted with chloroform. The chloroform layer was dried and evaporated; the oily residue was distilled in vacuo. The fraction distilling at 107–109° C./ 0.5 mm. Hg, consisting of N-ethyl-N-(2-methyl-1,4-benzodioxan)-hydrazine, was collected.

EXAMPLE 4

To a solution of N-(2-methyl-1,4-benzodioxan)-N'-isopropylidene-hydrazine (0.1 mol) in dry acetone (50 ml.) benzyl chloride (0.12 mol) and dry potassium carbonate (0.08 mol) were added at room temperature.

The mixture was refluxed for 4–5 hours in a stream of nitrogen. The salt was removed by filtration and the solvent distilled off. The residue was distilled under reduced pressure in a stream of nitrogen, the fraction passing at 124–129°/0.07–0.08 mm. Hg being collected.

The N-(2-methyl-1,4-benzodioxan)-N-benzyl-N' - isopropylidene-hydrazine is a very viscous oil which is easily hydrolysed by heating in an acid medium to give N-benzyl-N-(2-methyl-1,4-benzodioxan)-hydrazine.

EXAMPLE 5

To a solution of N-(2-methyl-1,4-benzodioxan)-N'-isopropylidene-hydrazine (0.1 mol) in acetone (50 ml.) (dried over $K_2CO_3$) benzyl chloride (0.12 mol) and dry pyridine (0.13 mol) were added at room temperature. The mixture was refluxed for 4–5 hours in a stream of nitrogen. The solvent was distilled off and the residue treated with ether (200 ml.) and water (70 ml.). The ether layer was washed with water and dried over $K_2CO_3$. The solvent was distilled off, and the fraction passing at 124° C./0.07 mm. was collected. The residue, consisting of N-(2-methyl-1,4-benzodioxan)-N-benzyl-N'-isopropylidene-hydrazine, was hydrolysed by refluxing with 2.5% HCl for 3 hours. The solution was cooled, made alkaline with 30% NaOH to litmus and the oil which separated was extracted with ether.

The ether layer was washed with water until neutral and dried over $K_2CO_3$. The solvent was distilled off, and the residue distilled under nitrogen. The fraction passing at 141–150° C./0.03 mm. Hg was collected.

EXAMPLE 6

*Preparation of N-Benzyl-N-(2-Methyl-1,4-Benzodioxan)-Hydrazine*

0.2 mol of benzyl-hydrazine are refluxed with 1 mole of anhydrous acetone in a nitrogen atmosphere for 3 hours. At the end of the heating, the acetone is removed by distillation, and the residue is distilled, the fraction passing in the 84–86° C. range at 0.15 mm. Hg and consisting of N-benzyl-N-'-isopropylidene-hydrazine being collected.

0.1 mol of N-benzyl-N'-isopropylidene-hydrazine, 0.12 mole of 2-bromomethyl-1,4-benzodioxan and 0.12 mol of trimethylamine are heated for 5 hours at 100–110° C. in a nitrogen atmosphere. After heating, ether and water are added. The ethereal layer is washed with water, and it is then dried over $K_2CO_3$. The solvent is removed by distillation, and the fractions boiling at up to 120° C. at 0.15 mm. Hg are removed. The residue consisting of N-(2 - methyl-1,4-benzodioxan)-N-benzyl-N'-isopropylidene-hydrazine, is hydrolysed by refluxing with 2.5% HCl for 3 hours. At the end the solution is cooled, made alkaline with 30% NaOH using phenolphthalein as indicator and the oil which separates is extracted with ether. The ethereal layer is washed with water until it is neutral, and it is then dried over $K_2CO_3$. The solvent is removed by distillation, and the fraction passing in the 141–150° C. range at 0.03–0.06 mm. Hg, consisting of N-benzyl-N-(2-methyl-1,4-benzodioxan)-hydrazine, is collected in a nitrogen atmosphere.

There now follow, by way of illustration only, examples of pharmaceutical formulations according to the invention containing, as active substance, N-benzyl-N-(2-methyl-1:4-benzodioxan)-hydrazine.

EXAMPLE 7

Tablets

[For 1000 tablets]

|  | Grams | |
|---|---|---|
| Active substance | 5 | 10 |
| Lactose | 155 | 150 |
| Corn Starch | 37 | 37 |
| Magnesium stearate | 3 | 3 |

The above substances are intermixed with one half of the magnesium stearate until a smooth powder is obtained, which is then compressed to form pellets. These pellets are granulated, and then the remaining magnesium stearate is added. The mixture is compressed to form tablets of 200 mg., each containing 5–10 mg. of active substance.

EXAMPLE 8

Capsules

[For 1000 capsules]

|  | Grams | |
|---|---|---|
| Active substance | 5 | 10 |
| Corn starch | 110 | 105 |
| Lactose | 79 | 79 |
| Talcum powder | 6 | 6 |

The substances are intermixed to give a smooth powder; hard gelatine capsules are filled with the powder so obtained, each containing 200 mg. of powder, i.e. 5–10 mg. of active substance.

EXAMPLE 9

Suppositories

[For 1000 suppositories]

|  | G. |
|---|---|
| Active substance | 10 |
| Silicic acid (colloidal) | 30 |
| Cocoa butter | 1960 |

The active substance and silicic acid (colloidal) are intermixed; the powder obtained is dispersed in the cocoa butter melted at 34–35° C.; the mass is then poured into a suppository mould.

1000 suppositories are obtained, each of them containing 10 mg. of active substance.

EXAMPLE 10

Ampoules

[For 1000 vials]

Active substance _____ g__ 5
Arachis oil, q.s. to 1000 ml.

Ampoules of 1 ml., each containing 5 mg. of active substance are prepared and sterilized at 120° C. for 1 hour.

We claim:
1. A compound selected from the group consisting of (1) a compound of the formula

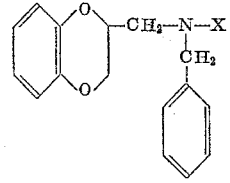

where X is a member selected from the group consisting of —NH$_2$ and

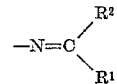

R$^1$ and R$^2$ each being a member selected from the group consisting of hydrogen, lower alkyl and phenyl and (2) a physiologically non-toxic acid addition salt thereof.

2. N-benzyl-N-(1,4-benzodioxan-2-methyl)-hydrazine.
3. N - benzyl-N-(1,4-benzodioxan-2-methyl)-hydrazine hydrochloride.
4. N - benzyl-N-(1,4-benzodioxan-2-methyl)-hydrazine acid oxalate.
5. N - benzyl-N-(1,4-benzodioxan-2-methyl)-hydrazine neutral oxalate.
6. N - benzyl-N-(1,4-benzodioxan-2-methyl)-hydrazine acid tartrate.

References Cited in the file of this patent

UNITED STATES PATENTS

| 2,075,359 | Salzberg et al. | Mar. 30, 1937 |
| 2,425,320 | Hill | Aug. 12, 1947 |
| 2,662,892 | Johnson | Dec. 15, 1953 |
| 2,725,386 | Bovet et al. | Nov. 29, 1955 |
| 3,088,871 | Pfeiffer | May 7, 1963 |
| 3,098,010 | Everett et al. | July 16, 1963 |